(12) United States Patent
Verbrugh

(10) Patent No.: US 11,994,606 B2
(45) Date of Patent: May 28, 2024

(54) USE OF VISIBLE LIGHT SIGNALS FOR DETERMINING ONE OR MORE PARAMETERS FOR PRESENCE DETECTION

(71) Applicant: SIGNIFY HOLDING B.V., Eindhoven (NL)

(72) Inventor: Stefan Marcus Verbrugh, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 327 days.

(21) Appl. No.: 17/620,953

(22) PCT Filed: Jun. 29, 2020

(86) PCT No.: PCT/EP2020/068228
§ 371 (c)(1),
(2) Date: Dec. 20, 2021

(87) PCT Pub. No.: WO2021/001305
PCT Pub. Date: Jan. 7, 2021

(65) Prior Publication Data
US 2022/0326342 A1    Oct. 13, 2022

(30) Foreign Application Priority Data

Jul. 1, 2019    (EP) .................... 19183524

(51) Int. Cl.
*G01S 5/16*      (2006.01)
*G01S 1/70*      (2006.01)
(Continued)

(52) U.S. Cl.
CPC .............. *G01S 5/16* (2013.01); *G01S 1/7036* (2019.08); *H05B 47/115* (2020.01); *H05B 47/195* (2020.01)

(58) Field of Classification Search
CPC ....... G01S 5/16; G01S 1/7036; H05B 47/115; H05B 47/195; H05B 47/165
(Continued)

(56) References Cited

U.S. PATENT DOCUMENTS 11,347,192 B2 * 5/2022 Caicedo Fernandez .....................
G05B 15/02
2019/0202445 A1 * 7/2019 Lavoie .................. H04W 4/023
2020/0196099 A1 * 6/2020 Huberman .............. G01S 5/018

FOREIGN PATENT DOCUMENTS

DE          19902213      *    7/2000
DE          19902213 A1        7/2000
(Continued)

*Primary Examiner* — Omar Casillashernandez

(57) ABSTRACT

A system is configured to obtain locations of a mobile device (1) and obtain presence detection information. The locations are determined using visible light signals and dead reckoning information recorded at different moments. The presence detection information indicates presence detected using presence sensor devices (31, 32) at the different moments. The system is further configured to obtain sensor locations and sensor fields of view, determine sensor orientations based on the locations of the mobile device, the sensor locations and the presence detection information, and determine a sensor coverage area (61, 62), comprising gaps in the sensor coverage area, based on the sensor locations, the sensor orientations and the sensor fields of view. The system is also configured to determine one or more parameters for presence detection based on the gaps in the sensor coverage area and output the parameters or a presence detection result which has been determined using the parameters.

14 Claims, 6 Drawing Sheets

(51) Int. Cl.
*H05B 47/115* (2020.01)
*H05B 47/195* (2020.01)

(58) Field of Classification Search
USPC ...................................................... 340/853.1
See application file for complete search history.

(56) References Cited

FOREIGN PATENT DOCUMENTS

| WO | 2013011395 | A2 | | 1/2013 | |
|----|------------|----|---|--------|---|
| WO | 2015144553 | A1 | | 10/2015 | |
| WO | WO-2017071969 | A1 | * | 5/2017 | ............. G05B 15/02 |
| WO | 2017125338 | A1 | | 7/2017 | |

* cited by examiner

USE OF VISIBLE LIGHT SIGNALS FOR DETERMINING ONE OR MORE PARAMETERS FOR PRESENCE DETECTION

CROSS-REFERENCE TO PRIOR APPLICATIONS

This application is the U.S. National Phase application under 35 U.S.C. § 371 of International Application No. PCT/EP2020/068228, filed on Jun. 29, 2020, which claims the benefit of European Patent Application No. 19183524.8, filed on Jul. 1, 2019. These applications are hereby incorporated by reference herein.

FIELD OF THE INVENTION

The invention relates to a system for determining one or more parameters for presence detection.

The invention further relates to a method of determining one or more parameters for presence detection.

The invention also relates to a computer program product enabling a computer system to perform such a method.

BACKGROUND OF THE INVENTION

At least two different systems are known to locate people in a building: sensors that are integrated in a building and indoor positioning systems. With indoor positioning systems, an app running on a mobile device (e.g. smart phone or tablet) locates itself in the building, e.g. using Visible Light Communication (VLC) or Bluetooth Low Energy (BLE). In the typical use case, a person is holding the mobile device and the location of the person and the mobile device is therefore the same or has a negligible distance. Indoor positioning systems typically work with a central database where locations and identifiers of the location beacons (VLC lights and/or BLE beacons) are stored. This database is typically stored in the cloud and the mobile device then accesses it via the Internet.

A disadvantage of Bluetooth positioning is that the accuracy of Bluetooth positioning is only about 2 meters. VLC-based indoor positioning systems are advantageous because they are accurate and fast, but the luminaire density needs to be such that there is always at least one luminaire in the field of view of the mobile device camera. The field of view of most mobile device cameras is approximately 45 degrees. In some cases, the luminaires are installed such that there is always a luminaire in view, but often the luminaires are further apart. The accuracy of VLC-based indoor positioning can be improved by using dead reckoning information like PDR (Pedestrian Dead Reckoning). An example of such a VLC-based indoor positioning is disclosed in WO 2017/125338 A1.

However, a disadvantage of VLC-based indoor positioning is that a mobile device is usually in someone's pocket. Sensors that are integrated in a building do not have this disadvantage. Sensors integrated in the ceiling, typically a PIR or thermopile, based on IR sensing, can detect the movement of people based on the fact that their body temperature is significantly higher than the ambient temperature.

Currently more and more IR sensors with multiple pixels are being used. These IR sensors could be regarded as low-resolution cameras (e.g. thermopile based), e.g. with a resolution of 32×24 pixels. This order of magnitude is an appropriate balance of resolution and cost. Several sensor functions may be integrated into a single device, e.g. a (thermopile-based) low-resolution IR camera and other sensing functions like e.g. a light sensor and a microphone. From an installation cost perspective, it is advantageous to integrate sensors in luminaires. This leverages the power and connectivity of the luminaire and in addition, only one installation action is needed to install both the luminaire and the sensor.

Sensing the presence of people by IR for the purpose of switching on the light has been known for several decades. Currently, IR sensing has become more advanced and includes counting and locating people. To this end, low-resolution IR cameras are often deployed, although counting people with a single IR sensor is possible as well. In advanced buildings, the sensor data are transmitted to a server where the data of all sensors is combined to provide meaningful information. In addition, the sensor data can be used locally to control luminaires. The information that is provided by all sensors in the building can be used e.g. to optimize building management or to facilitate the activities going on in the building. Use of the data can be in real time or data aggregated over a certain period may be used.

However, a drawback of using sensor systems to detect presence of people in a building (e.g. for people counting and/or location tracking) is that it is often a lot of work to commission the presence sensor devices and even after this commissioning, the presence detection may not be sufficiently reliable.

SUMMARY OF THE INVENTION

It is a first object of the invention to provide a system, which can be used to enable a sensor-based presence detection system to function reliably with limited commissioning effort.

It is a second object of the invention to provide a method, which can be used to enable a sensor-based presence detection system to function reliably with limited commissioning effort.

In a first aspect of the invention, a system for determining one or more parameters for presence detection comprises at least one input interface, at least one output interface, and at least one processor configured to obtain a plurality of locations of a mobile device, said plurality of locations being determined using visible light signals and dead reckoning information recorded at a plurality of moments, use said at least one input interface to obtain presence detection information, said presence detection information indicating presence detected using a plurality of presence sensor devices at said plurality of moments, and obtain sensor locations and sensor fields of view of said plurality of presence sensor devices.

Said at least one processor is further configured to determine sensor orientations of said plurality of presence sensor devices based on said locations of said mobile device, said sensor locations and said presence detection information, determine a sensor coverage area of said plurality of presence sensor devices, comprising gaps in said sensor coverage area, based on said sensor locations, said sensor orientations and said sensor fields of view, determine one or more parameters for presence detection based on said gaps in said sensor coverage area, and use said at least one output interface to output said one or more parameters or a presence detection result which has been determined using said one or more parameters.

By using visible light signals and dead reckoning information to calibrate a sensor-based presence detection system, the sensor-based presence detection system is able to function reliably with limited commissioning effort. Since reception of visible light signals is not required for presence detection, locating people becomes independent of their mobile device and an app running on their mobile device. The sensor-based presence detection system is calibrated by determining the orientations of the presence sensor devices, which must be related to the sensor data to enable meaningful use of the data and which are normally a hassle to determine, because luminaires generally have symmetry and the orientation is not tracked or part of the installation instruction. The sensor-based presence detection system is further calibrated by determining the gaps in the sensor coverage area, which is needed for the presence detection system to function reliably.

Said one or more parameters may include a sensitivity parameter for at least one of said presence sensor devices. For example, these one or more presence sensor devices may be configured to be more sensitive in order to reduce or remove one or more determined gaps in the sensor coverage area.

Said one or more parameters may include a plurality of sensitivity parameters for said at least one presence sensor device, said sensitivity parameters being different for different sets of sensors of said at least one presence sensor device, said different sets of sensors corresponding to different sensing angles of said at least one presence sensor device. This allows the sensitivity to be increased for certain sensing angles to reduce or remove gaps in the sensor coverage area while maintaining and/or decreasing sensitivity for certain other sensing angles in order to reduce overlaps in the sensor coverage area or prevent overlaps in the sensor coverage area from being created or increased, for example. This may be used with presence sensor devices that use a plurality of pixels, e.g. with each pixel having an own lens that can be mechanically adjusted using MEMS technology.

Said at least one processor may be configured to determine said presence detection result by correcting a count of concurrently present persons based on said gaps in said sensor coverage area. This may be used, for example, if it is not possible to reduce gaps (further) by increasing sensitivity, e.g. because a maximum sensitivity has already been reached.

Said at least one processor may be configured to correct said count of concurrently present persons based on a size of said gaps compared to a size of said coverage area. This is a relatively simple manner of correcting the count of concurrently present persons. It uses the assumption that statistically about the same number of persons per square meter is present in the gaps as outside the gaps (within the sensor coverage area). This is however not the most accurate manner of correcting the count of concurrently present persons.

Said at least one processor may be configured to not decrease said count upon detecting a person entering a gap in said sensor coverage area, determining whether said person entering said gap is likely the same as a person detected to enter said sensor coverage area and not increase said count upon detecting said person entering said sensor coverage area in dependence on said determination. This is a more accurate manner of correcting the count of concurrently present persons, but it requires more complex algorithms. For example, said at least one processor may be configured to determine a speed of said person entering said gap and determine said person entering said gap to be likely the same as said person detected to enter said coverage area based on said determined speed and a size of said gap.

Said person entering said gap may be determined to be likely the same as said person detected to enter said coverage area only if said gap is smaller than a threshold size. When a gap is too large, it may become too difficult to determine reliably whether a person that is detected as entering the coverage area, i.e. leaving the gap, is likely the same as a person that previously entered the gap. When a gap is large, the count may be decreased when a person enters the gap, for example.

Said presence sensor devices may include light sources for transmitting said visible light signals. By combining presence sensors and light sources in a single device, less devices need to be installed and the devices may be able to function more efficiently.

Said sensor locations may comprise locations associated with said light sources. This is beneficial if the locations associated with the light sources are the locations of the presence sensor devices and the sensors are embedded in the center of the presence sensor devices, for example. The locations of the light sources may have been determined when commissioning the light sources.

Said sensor coverage area may further include overlaps in said sensor coverage area and said at least one processor may be configured to determine said one or more parameters further based on said overlaps. This allows double counting of persons to be reduced or prevented.

Said one or more parameters may indicate whether a further presence detection technique should be used in combination with output from said plurality of presence sensor devices for presence detection. Said further presence detection technique may involve a further mobile device transmitting and/or receiving radio frequency signals, for example. This may allow the presence detection system to function reliably even when there are large gaps, for example.

In a second aspect of the invention, a method of determining one or more parameters for presence detection comprises obtaining a plurality of locations of a mobile device, said plurality of locations being determined using visible light signals and dead reckoning information recorded at a plurality of moments, obtaining presence detection information, said presence detection information indicating presence detected using a plurality of presence sensor devices at said plurality of moments, obtaining sensor locations and sensor fields of view of said plurality of presence sensor devices, and determining sensor orientations of said plurality of presence sensor devices based on said locations of said mobile device, said sensor locations and said presence detection information.

Said method further comprises determining a sensor coverage area of said plurality of presence sensor devices, comprising gaps in said sensor coverage area, based on said sensor locations, said sensor orientations and said sensor fields of view, determining one or more parameters for presence detection based on said gaps in said sensor coverage area, and outputting said one or more parameters or a presence detection result which has been determined using said one or more parameters. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for of determining one or more parameters for presence detection.

The executable operations comprise obtaining a plurality of locations of a mobile device, said plurality of locations being determined using visible light signals and dead reckoning information recorded at a plurality of moments, obtaining presence detection information, said presence detection information indicating presence detected using a plurality of presence sensor devices at said plurality of moments, obtaining sensor locations and sensor fields of view of said plurality of presence sensor devices, determining sensor orientations of said plurality of presence sensor devices based on said locations of said mobile device, said sensor locations and said presence detection information.

The executable operations further comprise determining a sensor coverage area of said plurality of presence sensor devices, comprising gaps in said sensor coverage area, based on said sensor locations, said sensor orientations and said sensor fields of view, determining one or more parameters for presence detection based on said gaps in said sensor coverage area, and outputting said one or more parameters or a presence detection result which has been determined using said one or more parameters As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
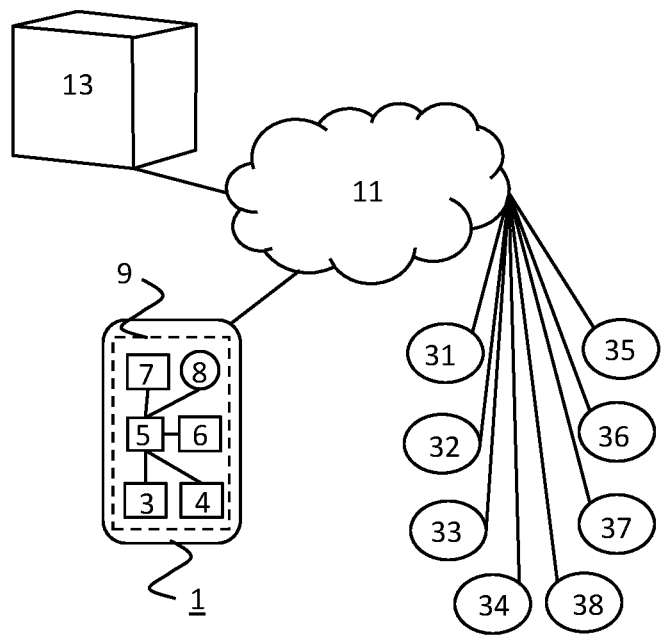
FIG. 1 is a block diagram of a first embodiment of the system.

FIG. 1 shows a first embodiment of the system for determining one or more parameters for presence detection. In the embodiment of FIG. 1, the system is a mobile device 1. The mobile device 1 is connected to the Internet 11, e.g. via a wireless LAN access point or a cellular communication network. An Internet server 13 is also connected to the Internet 11. In the example of FIG. 1, a plurality of presence sensor devices 31-38 is used for the presence detection.

The mobile device 1 comprises a receiver 3, a transmitter 4, a processor 5, memory 7, a sensor module 6, a camera 8 and a display 9. The sensor module 6 may comprise an accelerometer and a magnetometer, for example. The processor 5 is configured to obtain a plurality of locations of the mobile device 1. The locations are determined using visible light signals and dead reckoning information recorded at a plurality of moments. The processor 5 is further configured to use the receiver 3 to obtain presence detection information. The presence detection information indicates presence detected using the presence sensor devices 31-38 at the plurality of moments.

The processor 5 is also configured to obtain sensor locations and sensor fields of view of the plurality of presence sensor devices 31-38 from the Internet server 13 and determine sensor orientations of the plurality of presence sensor devices 31-38 based on the locations of the mobile device 1, the sensor locations and the presence detection information. The processor 5 is further configured to determine a sensor coverage area of the plurality of presence sensor devices, comprising gaps in the sensor coverage area, based on the sensor locations, the sensor orientations and the sensor fields of view.

The processor 5 is also configured to determine one or more parameters for presence detection based on the gaps in the sensor coverage area and use the transmitter 4 and/or the display 9 to output the one or more parameters or a presence detection result which has been determined using the one or more parameters.

The typical viewing angle of a front camera of a mobile device is 40-50 degrees. The viewing angle of a low-resolution IR camera is much larger, typically in the range 70-110 degrees. However, with dead reckoning information, the accuracy of VLC detection using the front camera can be improved.

As one cannot assume that all people in the building always carry mobile devices that are able to receive VLC signals, the disadvantages of sensor systems are alleviated by a calibration step, using the VLC signals as ground truth. This solution is based on the fact that a VLC indoor positioning system has a specification of 30 cm accuracy and with a few simple measures, even 10 cm can be reached. That is a very good ground truth for sensor calibration.

The locations may be determined using the camera 8 or using a light sensor included in the sensor module 6. The advantage of using a light sensor is lower battery consumption and lower device cost if the camera 8 is omitted. Disadvantage is that the accuracy positioning with a single light sensor is lower. In order to accurately locate people in a building, the location and installation height of the sensor needs to be accurately known (a sensor has a certain field of view and the area that is covered with this field of view depends on the installation height).

In the embodiment of the mobile device 1 shown in FIG. 1, the mobile device 1 comprises one processor 5. In an alternative embodiment, the mobile device 1 comprises multiple processors. The processor 5 of the mobile device 1 may be a general-purpose processor, e.g. from ARM or Qualcomm or an application-specific processor. The processor 5 of the mobile device 1 may run an Android or iOS operating system for example. The display 9 may comprise an LCD or OLED display panel, for example. The memory 7 may comprise one or more memory units. The memory 7 may comprise solid state memory, for example. The camera 8 may comprise a CMOS or CCD sensor, for example. This camera may be a general-purpose camera, or a camera specifically designed for reception of visible light communication signals.

The receiver 3 and the transmitter 4 may use one or more wireless communication technologies such as Wi-Fi (IEEE 802.11) to communicate with an access point to the Internet 11, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The mobile device 1 may comprise other components typical for a mobile device such as a battery and a power connector. The invention may be implemented using a computer program running on one or more processors.

In the embodiment of FIG. 1, the system is a mobile device. In an alternative embodiment, the system of the invention is a different device, e.g. a computer. In the embodiment of FIG. 1, the system of the invention comprises a single device. In an alternative embodiment, the system of the invention comprises a plurality of devices.

Figure 2:
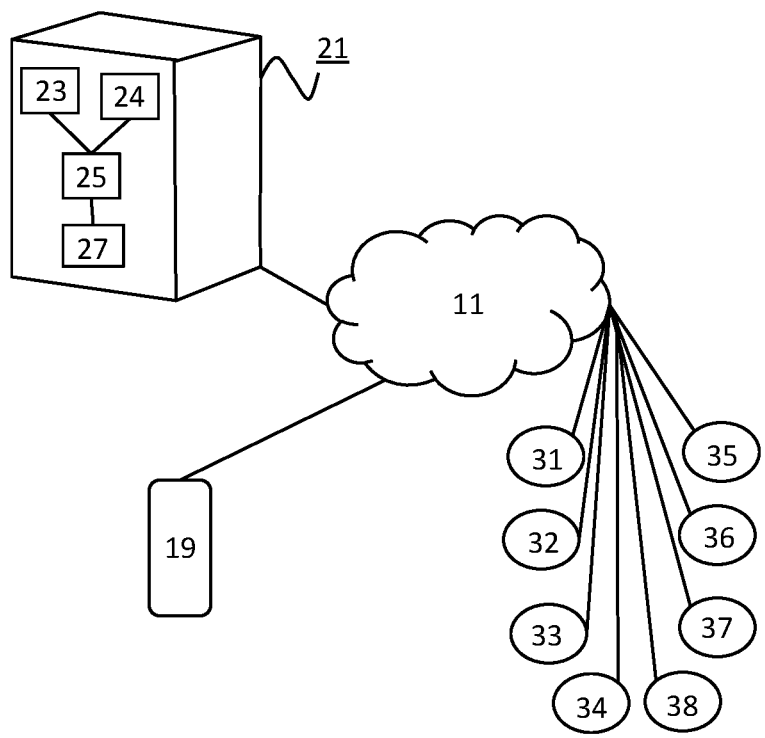
FIG. 2 is a block diagram of a second embodiment of the system.

FIG. 2 shows a second embodiment of the system for determining one or more parameters for presence detection. In the embodiment of FIG. 2, the system is a computer 21. The computer is connected to the Internet 11 and acts as a server. The computer 21 comprises a receiver 23, a transmitter 24, a processor 25, and storage means 27. The processor 25 is configured obtain a plurality of locations of a mobile device 19 from the mobile device 19. The locations are determined by the mobile device 19 using visible light signals and dead reckoning information recorded at a plurality of moments.

The processor 25 is further configured to use the receiver 23 to obtain presence detection information. The presence detection information indicates presence detected using the presence sensor devices 31-38 at the plurality of moments. The presence detection information may be received from the presence sensor device 31-38, for example. The processor 25 is also configured to obtain sensor locations and sensor fields of view of the plurality of presence sensor devices 31-38. The sensor location and sensor fields may be stored in the storage means 27, for example.

The processor 25 is further configured to determine sensor orientations of the plurality of presence sensor devices 31-38 based on the locations of the mobile device 19, the sensor locations and the presence detection information. The processor 25 is also configured to determine a sensor coverage area of the plurality of presence sensor devices 31-38, comprising gaps in the sensor coverage area, based on the sensor locations, the sensor orientations and the sensor fields of view.

The processor 25 is further configured to determine one or more parameters for presence detection based on the gaps in the sensor coverage area and use the transmitter 24 to output the one or more parameters or a presence detection result which has been determined using the one or more parameters. The one or more parameters may be transmitted to the presence sensor devices 31-38, for example. The presence detection result may be transmitted to the mobile device 19, for example.

In the embodiment of the computer 21 shown in FIG. 2, the computer 21 comprises one processor 25. In an alternative embodiment, the computer 21 comprises multiple processors. The processor 25 of the computer 21 may be a general-purpose processor, e.g. from Intel or AMD, or an application-specific processor. The processor 25 of the computer 21 may run a Windows or Unix-based operating system for example. The storage means 27 may comprise one or more memory units. The storage means 27 may comprise one or more hard disks and/or solid-state memory, for example. The storage means 27 may be used to store an operating system, applications and application data, for example.

The receiver 23 and the transmitter 24 may use one or more wired and/or wireless communication technologies such as Ethernet and/or Wi-Fi (IEEE 802.11) to communicate with an access point to the Internet 11, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 23 and the transmitter 24 are combined into a transceiver. The computer 21 may comprise other components typical for a computer such as a power connector and a display. The invention may be implemented using a computer program running on one or more processors.

Figure 3:
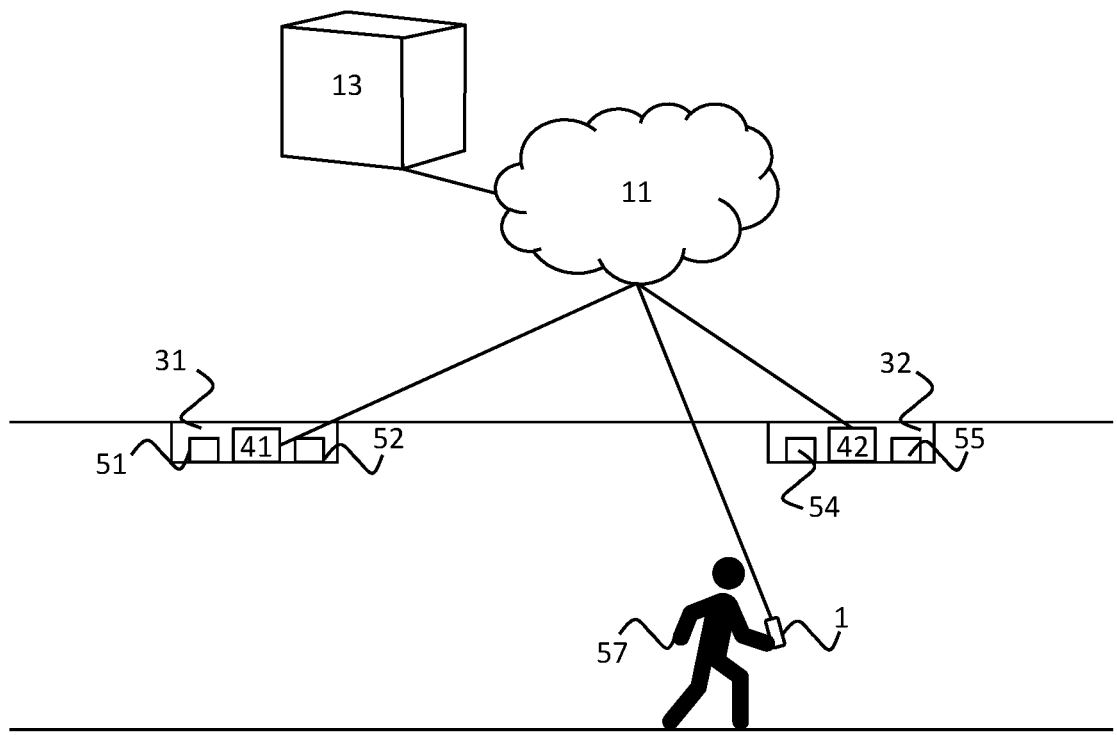
FIG. 3 shows the mobile device and the presence sensor devices of FIG. 1 communicating with the Internet server of FIG. 1.

FIG. 3 shows the mobile device and the presence sensor devices of FIG. 1 communicating with the Internet server of FIG. 1. In the example of FIG. 3, the presence sensor devices 31 and 32 are luminaires that include light sources 51-54 for transmitting the visible light signals. Presence sensor device 31 comprises light sources 51 and 52 and a sensor 41. Presence sensor device 32 comprises light sources 53 and 54 and a sensor 42. The sensor locations may comprise locations associated with the light sources, for example.

In the example of FIG. 3, a common server is used, and combined data are stored on the server. In FIG. 3, the common server is an Internet server 13. In an alternative embodiment, the server is local, e.g. on-premise. The data is exchanged in real-time between the presence sensor devices 31 and 32 and the mobile device 1, via the Internet server 13. A person 57 is holding the mobile device 1.

Figure 4:
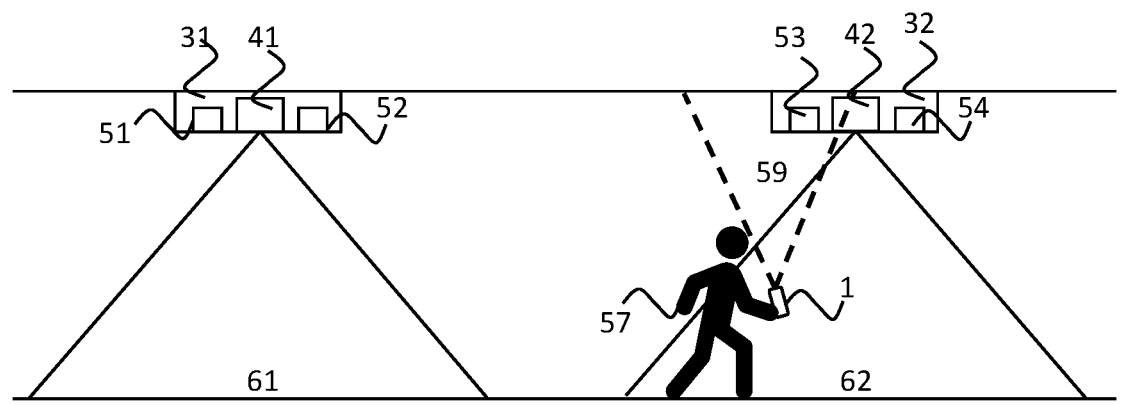
FIG. 4 illustrates the determination of the one or more presence detection parameters being performed.

FIG. 4 illustrates the determination of the one or more presence detection parameters, i.e. illustrates the presence detection being calibrated with the help of VLC indoor positioning. After this calibration phase, the sensors collect data for performing presence detection, locating people especially.

The location of each luminaire, its VLC-ID and installation height are stored in a central database on the common server for the purpose of VLC indoor positioning. The locations of the luminaires are typically very precise, as required for indoor navigation. Integrated sensors are at the same locations as the luminaires, so the database can be leveraged to locate the sensors and hence generate meaningful information from the sensor data, since the location is known. To achieve this, the sensor data is linked to the VLC-ID.

In a simple embodiment of the system, the location of the luminaire is used as the location of the sensor. However, VLC uses the center of gravity of the light emitting surface of the luminaire and this is generally not exactly where the sensor is mounted. In a more advanced embodiment, it is taken into account that the sensor is not in the center of the luminaire. Instead, the precise location of the sensor is indicated, e.g. in AutoCAD.

In general, the sensor is mounted in the luminaire with an arbitrary orientation and luminaires are installed with an arbitrary orientation in the building. Taking the orientation of the sensor into account during assembly of the luminaire and installation in the building would significantly increase cost and risk of errors. Therefore, data from each sensor 41 and 42 is collected while the person 57 is walking underneath with the mobile device 1, which features VLC-based indoor positioning. The VLC signals are emitted by the light sources 51-54. If there is only one person and one mobile device in the room and one of the sensors detects presence, the obtained location of this sensor and the determined location of the mobile device can be used to determine the orientation of the sensor. The sensor orientation may comprise, for example, a tilt angle, e.g. 15 degrees tilted compared to a fully downward oriented beam, and a tilt direction, e.g. 30 degrees (with 0 degrees being North).

In the example of FIG. 4, the person 57 is in the coverage area 62 of the presence sensor device 32 and the light source 53 is in the coverage area 59 of the camera of the mobile device 1 and the mobile device 1 is therefore able to receive and decode the VLC signals transmitted by the light source 53. By combining sensor data and location data from the VLC-based positioning, the orientation of the sensor is automatically determined and stored. From that moment onwards, the sensor can locate people in its vicinity even if they do not have a mobile device featuring VLC-based indoor positioning or if they have their mobile device in their pocket.

Data from the person 57 walking through the building with the mobile device 1 is also used to determine which area is covered by a certain sensor, whether the areas of sensors overlap and whether there are gaps in coverage. For example, first the coverage area per presence sensor device may be determined and then the overall coverage area may be determined. The coverage area is determined based on the sensor locations (e.g. X, Y, Z coordinates), sensor orientations and sensor fields of view. The fields of view may be in the range of 70-110 degrees, for example. The coverage area may be determined in 2 dimensions, e.g. on the floor, or in 3 dimensions. The coverage area, the gaps and overlaps, may be specified as pixels or voxels in an image representation representing a space, e.g. floor of a building, or comparable values in a matrix representing the space, for example.

Alternatively, the coverage area, the gaps and overlaps, may be, for example, specified as shapes, e.g. the coverage area of a presence sensor device located at (x1, y1, z1) may be specified as a circle with a radius of A meters at location (x1, y1, 0) if the sensor is not tilted.

In FIG. 4, the presence sensor device 31 has a coverage area 61 and the presence sensor device 32 has a coverage area 62. It is preferably considered that if a person walks with a mobile device, the camera is about 30 cm away from the body. Hence, there is an offset of about 30 cm between the IR sensor measurement and the position determined with VLC. As VLC-based indoor positioning with dead reckoning information is used, direction (heading) information can be used to correct this offset.

Registering overlapping areas is very useful to avoid double counting of people. In addition, if a person is detected to walk in the field-of-view of a sensor and walks out of the field-of-view and into a gap with a certain speed and later a person is detected entering an adjacent sensor with the same speed (and direction), an algorithm can conclude that this is the same person. During the calibration action, the person 57 may need to walk at continuous speed, in order to make dead reckoning (e.g. Pedestrian Dead Reckoning; PDR) work optimal.

Figure 5:
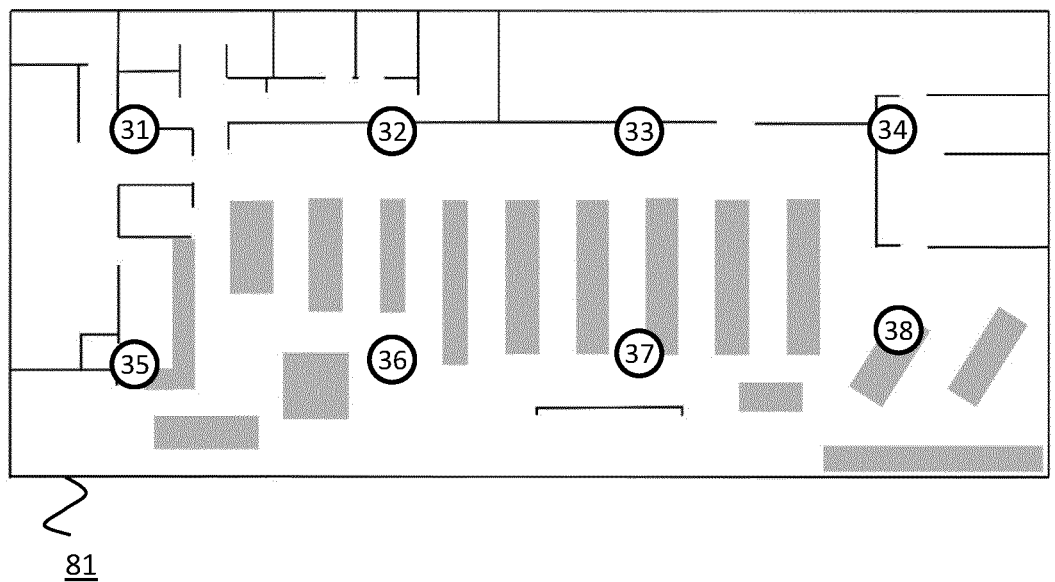
FIG. 5 shows an example of a floor on which the presence sensor devices of FIG. 1 have been installed.
Figure 6:
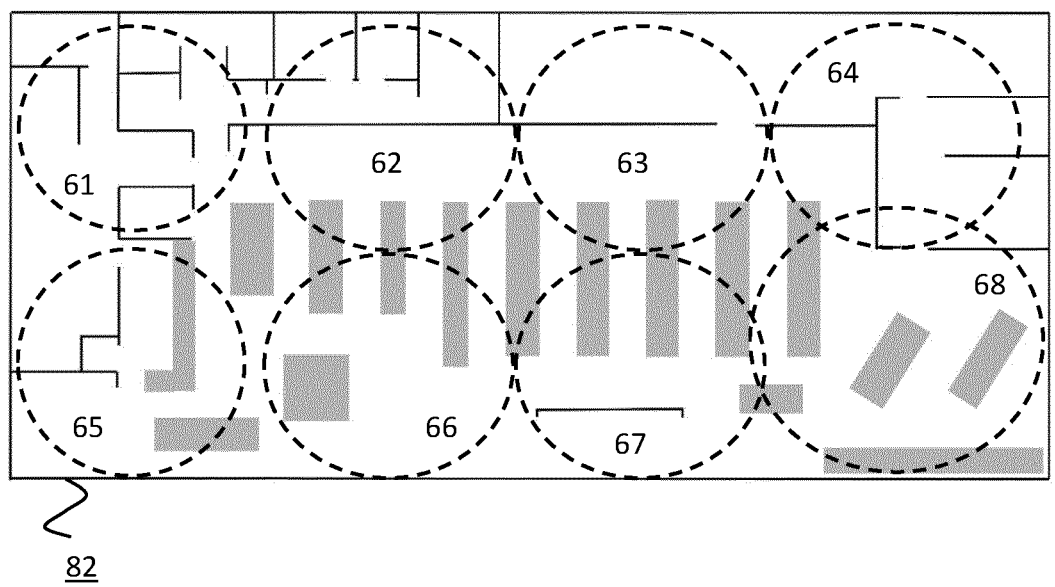
FIG. 6 shows the coverage areas of the presence sensor devices of FIG. 5.

FIG. 5 shows an example of a floor plan 81 indicating where the presence sensor devices 31-38 of FIG. 1 have been installed. FIG. 6 shows the sensor coverage areas 61-68 of the individual presence sensor devices 31-38 on floor plan 82. FIG. 6 shows that the (overall) sensor coverage area includes a few gaps, e.g. between the sensor coverage areas 61, 62, 65 and 66. The sensor coverage area further includes overlaps in the sensor coverage area, e.g. between sensor coverage areas 64 and 68. The one or more parameters may further be based on the determined overlaps.

Figure 7:
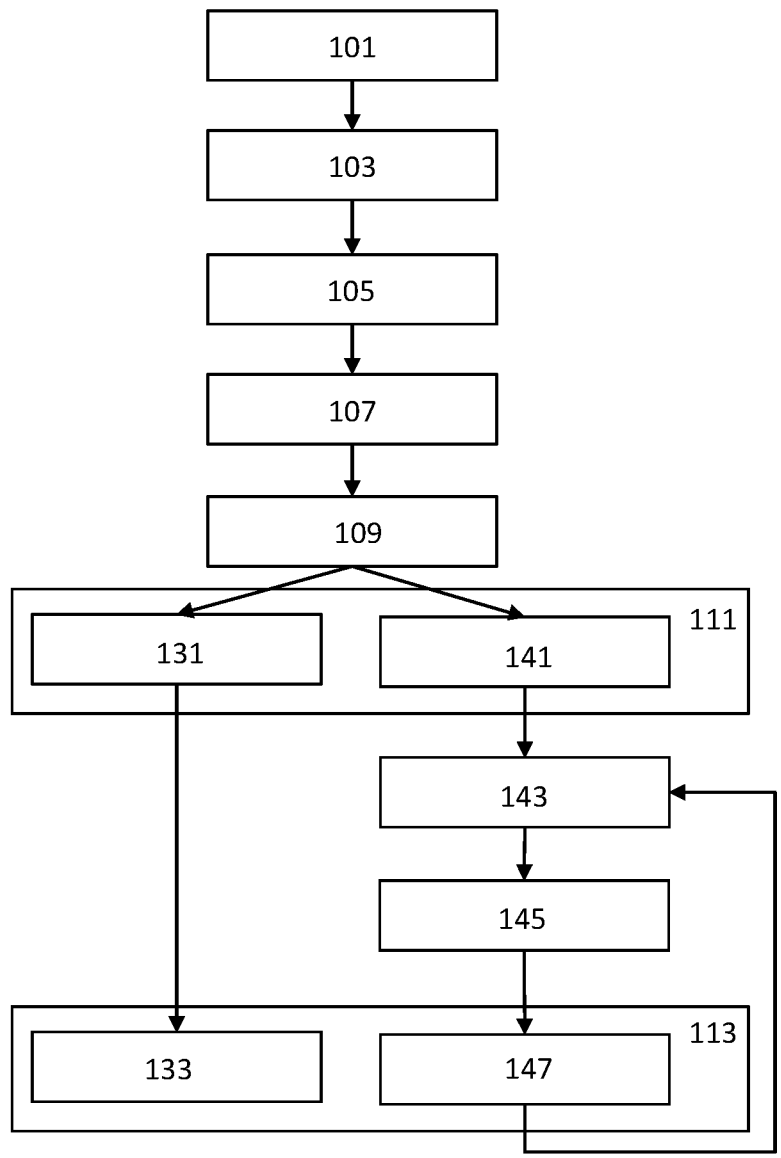
FIG. 7 is a flow diagram of a first embodiment of the method.

A first embodiment of the method of determining one or more parameters for presence detection is shown in FIG. 7. A step 101 comprises obtaining a plurality of locations of a mobile device. The plurality of locations is determined using visible light signals and dead reckoning information recorded at a plurality of moments. A step 103 comprises obtaining presence detection information. The presence detection information indicates presence detected using a plurality of presence sensor devices at the plurality of moments. A step 105 comprises obtaining sensor locations and sensor fields of view of the plurality of presence sensor devices.

A step 107 comprises determining sensor orientations of the plurality of presence sensor devices based on the locations of the mobile device, the sensor locations and the presence detection information. A step 109 comprises determining a sensor coverage area of the plurality of presence sensor devices, comprising gaps in the sensor coverage area, based on the sensor locations, the sensor orientations and the sensor fields of view. A step 111 comprises determining one or more parameters for presence detection based on the gaps in the sensor coverage area.

In the embodiment of FIG. 7, step 111 comprises steps 131 and 141 as sub steps. Step 131 comprises determining a sensitivity parameter for at least one of the presence sensor devices. If the at least one presence sensor device comprises a presence sensor device with different sets of sensors and the different sets of sensors correspond to different sensing angles, a plurality of sensitivity parameters may be determined for this presence sensor device. By using different sensitivity parameters for different sets of sensors, both the number and/or size of the gaps and the number and/or size of the overlaps may be reduced.

For single-pixel PIR detectors, the sensitivity is different at different angles and it may not be possible to detect persons at the end of the sensor range at large angles accurately. This may result in false detections and/or it may not be possible to determine precise locations. If two high sensitivity regions of the coverage areas of different presence senor devices overlap, then this may result in one person being detected twice, by the different presence sensor devices. By reducing the sensitivity of a single-pixel PIR detector, one or more gaps in the coverage area of the sensors may be created. If a multi-pixel PIR detector is used with different sensing angles per sensor (pixel), it may be possible to configure the sensitivity per sensor (pixel) to reduce both the number and/or size of the gaps and the number and/or size of the overlaps.

In steps 141 to 145, the presence detection result is determined by correcting a count of concurrently present persons based on the gaps in the sensor coverage area. Step 141 comprises determining a size of the one or more gaps, e.g. X %, and a size of the sensor coverage area, e.g. Y %. A step 143 comprises receiving sensor data from the presence sensor devices. A step 145 comprises determining how many persons are concurrently present based on the sensor data and adjusting this number to compensate for the gaps, e.g. by multiplying this number with X/Y. Thus, the count of concurrently present persons is corrected based on the size of the gaps compared to the size of the coverage area.

A step 113 comprises outputting the one or more parameters or a presence detection result which has been determined using the one or more parameters. In the embodiment of FIG. 7, step 113 comprises steps 133 and 147 as sub steps. Step 133 comprises configuring the at least one presence sensor detector device for which a sensitivity parameter was determined in step 131 with this/these sensitivity parameter(s). Step 147 comprises outputting the (adjusted) number of persons determined in step 145.

Figure 8:
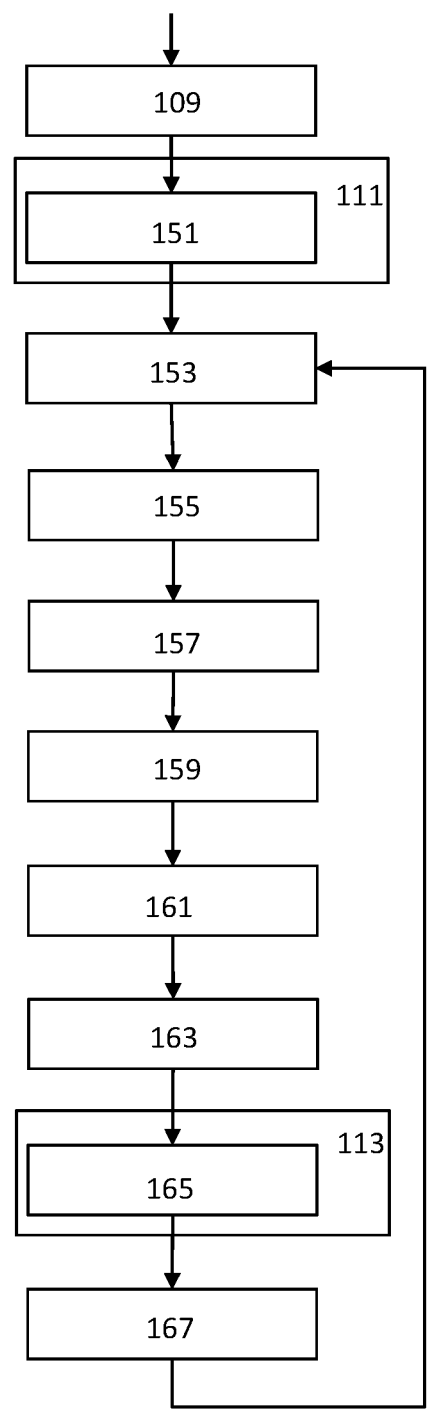
FIG. 8 is a flow diagram of a second embodiment of the method.

A second embodiment of the method of determining one or more parameters for presence detection is shown in FIG. 8. Steps 101 to 109 of FIG. 7 are performed before step 111 of FIG. 8 (of which steps 101 to 107 are not shown). In the embodiment of FIG. 8, step 111 comprises a sub step 151. Step 151 comprises determining the size and locations of the gaps determined in step 109. Next, steps 153 to 163 are performed. Step 153 comprises receiving sensor data from the presence sensor devices. The sensor data indicates whether presence was detected and by which presence sensor device presence was detected. In the embodiment of FIG. 8, the presence sensor devices comprise multi-pixel sensor arrays and the sensor indicates a coarse location of the detected person.

Step 155 comprises identifying which detected persons, as indicated in the received sensor data, are the same as persons detected at the previous moment, as indicated in sensor data received in the previous iteration of step 153. This identification is performed based on the current and previous locations of the detected persons. A currently detected person may be considered the same as a previously detected person if the location of the currently detected person is within a certain distance of the location of the previously detected person.

If a currently detected person could be the same as a plurality of previously detected persons, then a previously determined direction and/or speed of the previously detected persons may be compared with a direction and/or speed of the currently detected person to estimate which persons are the same. Step 153 may comprise estimating the possible direction and/or speed of the currently detected person multiple times using the locations of each of the previously detected persons (as stored in step 167). If a person was previously in a gap in the coverage area or is currently in a gap in the coverage area, it is not possible to identify this person from both current and previous sensor data.

Step 157 comprises counting the number of persons that stayed within the coverage area based on the results of step 155. Step 159 comprises determining the location of each person who just entered the coverage area. Step 161 comprises determining whether the persons entering the coverage area may previously have entered a gap. This is determined based on previously determined detection locations, detection times, speeds and directions of persons that did not stay within the coverage area and based on the size of the gap in question (e.g. it may be considered unlikely that a person with a certain initial speed would cross a gap of a certain size within a certain time, i.e. at a much higher speed). This is only performed for gaps smaller than a threshold size. Step 161 also comprises counting the number of currently detected persons determined to likely have previously entered a gap. Step 163 comprises adding the number of persons that stayed within the coverage area, as counted in step 159, and the number of persons that likely previously entered a gap in the coverage area, as determined in step 161.

Thus, the count is not decreased in step 157 upon detecting a person entering a gap in the sensor coverage area and step 161 comprises determining whether the person entering the gap is likely the same as a person detected to enter the sensor coverage area. The count is not increased upon detecting the person entering the sensor coverage area in dependence on the determination. A speed of the person entering the gap is determined and the person entering the gap is determined to be likely the same as the person detected to enter the coverage area based on the determined speed and a size of the gap In the embodiment of FIG. 8, step 113 comprises a step 165. Step 165 comprises outputting the number of persons determined to be present, as determined in step 163. Next, a step 167 is performed. Step 167 comprises storing detection locations and detection times of currently detected persons and estimated speeds and directions.

In an alternative embodiment, the one or more determined parameters indicate whether a further presence detection technique should be used in combination with output from the plurality of presence sensor devices for presence detection. The further presence detection technique may involve a further mobile device transmitting and/or receiving radio frequency signals, for example. The further presence detection technique may use Bluetooth, for example. The accuracy of Bluetooth Indoor positioning is in the order of 2 meters and by combining with data from IR sensors, this can be significantly improved (provided that there are not many people present).

Figure 9:
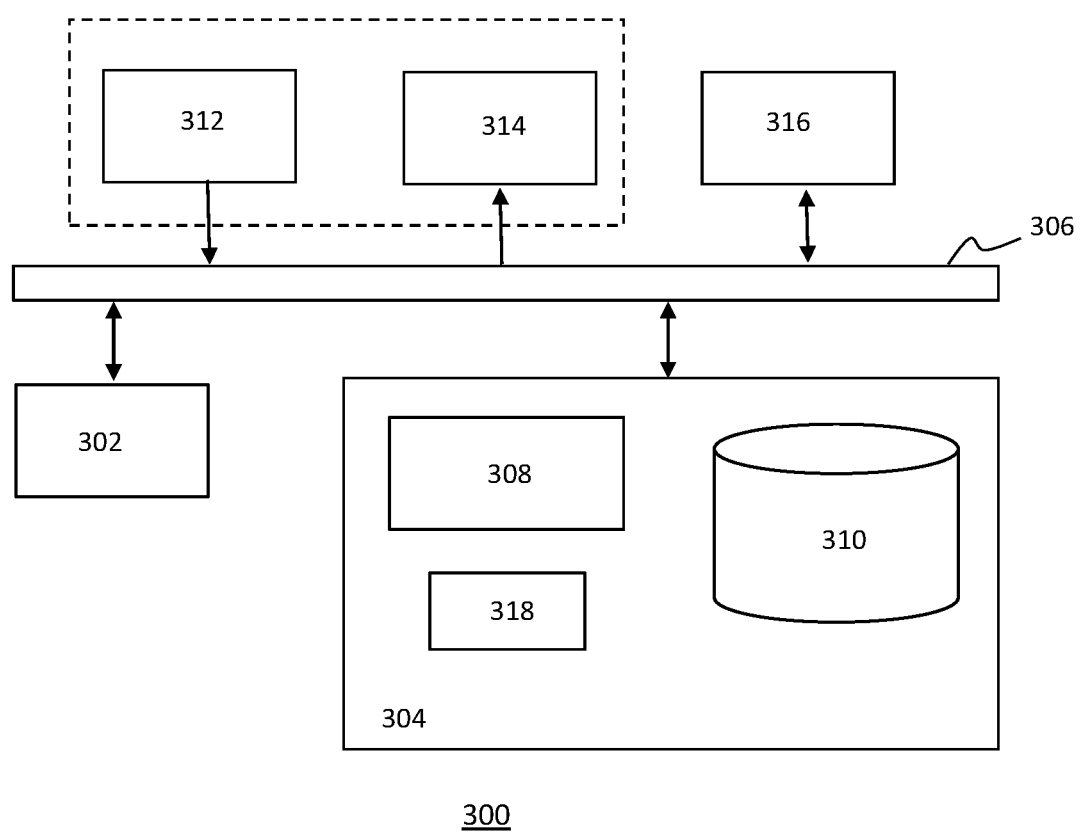
FIG. 9 is a block diagram of an exemplary data processing system for performing the method of the invention.

FIG. 9 depicts a block diagram illustrating an exemplary data processing system that may perform the method as described with reference to FIGS. 7 and 8

As shown in FIG. 9, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 9 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 9, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 9) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for determining one or more presense sensor sensitivity parameters for presence detection, said system comprising:
at least one input interface;
at least one output interface; and
at least one processor configured to:
obtain a plurality of locations of a mobile device, said said plurality of locations being determined using visible light signals and dead reckoning information recorded at a plurality of moments,
use said at least one input interface to obtain presence detection information, said presence detection information indicating presence detected using a plurality of presence sensor devices at said plurality of moments,
obtain sensor locations and sensor fields of view of said plurality of presence sensor devices,
determine sensor orientations of said plurality of presence sensor devices based on said locations of said mobile device, said sensor locations and said presence detection information,
determine a sensor coverage area of said plurality of presence sensor devices, comprising gaps in said sensor coverage area, based on said sensor locations, said sensor orientations and said sensor fields of view,
determine one or more presence sensor sensitiviy parameters for presence detection based on said gaps in said sensor coverage area, and
use said at least one output interface to output said one or more presence sensor sensitivity parameters or a presence detection result which has been determined using said one or more presence sensor sensitivity parameters.

2. The system as claimed in claim 1, wherein said one or more presence sensor sensitivity parameters include a plurality of sensitivity parameters for said at least one presence sensor device, said sensitivity parameters being different for different sets of sensors of said at least one presence sensor device, said different sets of sensors corresponding to different sensing angles of said at least one presence sensor device.

3. The system as claimed in claim 1, wherein said at least one processor is configured to determine said presence detection result by correcting a count of concurrently present persons based on said gaps in said sensor coverage area.

4. The system as claimed in claim 3, wherein said at least one processor is configured to correct said count of concurrently present persons based on a size of said gaps compared to a size of said coverage area.

5. The system as claimed in claim 3, wherein said at least one processor is configured to not decrease said count upon detecting a person entering a gap in said sensor coverage area, determining whether said person entering said gap is likely the same as a person detected to enter said sensor coverage area and not increase said count upon detecting said person entering said sensor coverage area in dependence on said determination.

6. The system as claimed in claim 5, wherein said person entering said gap is only determined to be likely the same as said person detected to enter said coverage area if said gap is smaller than a threshold size.

7. The system as claimed in claim 5, wherein said at least one processor is configured to determine a speed of said person entering said gap and determine said person entering said gap to be likely the same as said person detected to enter said coverage area based on said determined speed and a size of said gap.

8. The system as claimed in claim 1, wherein said presence sensor devices include light sources for transmitting said visible light signals.

9. The system as claimed in claim 8, wherein said sensor locations comprise locations associated with said light sources.

10. The system as claimed in claim 1, wherein said sensor coverage area further includes overlaps in said sensor coverage area and said at least one processor configured to determine said one or more parameters further based on said overlaps.

11. The system as claimed in claim 1, wherein said one or more presence sensor sensitivity parameters indicate whether a further presence detection technique should be used in combination with output from said plurality of presence sensor devices for presence detection.

12. The system as claimed in claim 11, wherein said further presence detection technique involves a further mobile device transmitting and/or receiving radio frequency signals.

13. A method of determining one or more presence sensor sensitivity parameters for presence detection, said method comprising:
- obtaining a plurality of locations of a mobile device, said plurality of locations being determined using visible light signals and dead reckoning information recorded at a plurality of moments;
- obtaining presence detection information, said presence detection information indicating presence detected using a plurality of presence sensor devices at said plurality of moments;
- obtaining sensor locations and sensor fields of view of said plurality of presence sensor devices;
- determining sensor orientations of said plurality of presence sensor devices based on said locations of said mobile device, said sensor locations and said presence detection information;
- determining a sensor coverage area of said plurality of presence sensor devices, comprising gaps in said sensor coverage area, based on said sensor locations, said sensor orientations and said sensor fields of view;
- determining one or more presence sensor sensitivity parameters for presence detection based on said gaps in said sensor coverage area; and
- outputting said one or more presence sensor sensitivity parameters or a presence detection result which has been determined using said one or more presence sensor sensitivity parameters.

14. A non-transitory computer readable medium storing instructions when executed by a computer system, cause the computer system to perform the method of claim 13.

* * * * *